US012187958B2

(12) United States Patent
Deville et al.

(10) Patent No.: US 12,187,958 B2
(45) Date of Patent: Jan. 7, 2025

(54) RHEOLOGY MODIFIERS FOR HIGH FLUID-LOSS SQUEEZE LOST CIRCULATION MATERIALS

(71) Applicant: Halliburton Energy Services, Inc., Houston, TX (US)

(72) Inventors: Jay Paul Deville, Spring, TX (US); Hui Zhou, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/766,814

(22) PCT Filed: Dec. 18, 2020

(86) PCT No.: PCT/US2020/065830
§ 371 (c)(1),
(2) Date: Apr. 6, 2022

(87) PCT Pub. No.: WO2021/167691
PCT Pub. Date: Aug. 26, 2021

(65) Prior Publication Data
US 2023/0078038 A1 Mar. 16, 2023

Related U.S. Application Data

(60) Provisional application No. 62/978,449, filed on Feb. 19, 2020.

(51) Int. Cl.
*C09K 8/514* (2006.01)
*B82Y 30/00* (2011.01)
(52) U.S. Cl.
CPC .............. *C09K 8/514* (2013.01); *B82Y 30/00* (2013.01); *C09K 2208/08* (2013.01); *C09K 2208/10* (2013.01)

(58) Field of Classification Search
CPC ........ C09K 8/514; C09K 8/516; C09K 8/508; C09K 8/506; C09K 8/504; C09K 8/50;
(Continued)

(56) References Cited

U.S. PATENT DOCUMENTS 3,882,029 A 5/1975 Fischer et al.
8,739,872 B1 * 6/2014 Miller .................. E21B 33/138
507/104
(Continued)

FOREIGN PATENT DOCUMENTS

EP 2398866 B1 * 3/2015 ............... C09K 8/16
WO 2016007149 1/2016
WO 2016164037 10/2016

OTHER PUBLICATIONS

Merriam-Webster dictionary, fibril, retrieved Apr. 21, 2023 from https://www.merriam-webster.com/dictionary/fibril#medicalDictionary (Year: 2023).*
(Continued)

*Primary Examiner* — Angela M DiTrani Leff
(74) *Attorney, Agent, or Firm* — Thomas Rooney; C. Tumey Law Group, PLLC

(57) ABSTRACT

Methods and compositions for servicing a wellbore and, in certain embodiments, to the use of compositions in a wellbore to mitigate lost circulation. In some embodiments, the methods include providing a treatment fluid that includes an aqueous base fluid, a lost circulation material, and a rheology modifier that includes a nanocellulose material; introducing the treatment fluid into a wellbore penetrating at least a portion of a subterranean formation including a loss zone; and allowing the treatment fluid to rapidly defluidize in the loss zone.

12 Claims, 1 Drawing Sheet

(58) Field of Classification Search
CPC . C09K 8/42; C09K 8/487; C09K 8/03; C09K 8/426; C09K 2208/08; C09K 2208/10; E21B 21/00; E21B 21/003
See application file for complete search history.

(56) References Cited

U.S. PATENT DOCUMENTS

| | | |
|---|---|---|
| 2003/0195120 A1 | 10/2003 | Halliday et al. |
| 2012/0181019 A1 | 7/2012 | Saini et al. |
| 2012/0264659 A1* | 10/2012 | Kulkarni ................. C09K 8/34 507/139 |
| 2013/0035263 A1* | 2/2013 | Laukkanen ............. C09K 8/90 977/788 |
| 2013/0196883 A1* | 8/2013 | Rincon-Torres ........ C04B 28/02 507/112 |
| 2013/0274149 A1* | 10/2013 | Lafitte .................... C09K 8/514 507/112 |
| 2015/0368541 A1* | 12/2015 | Monclin .................. C09K 8/80 507/108 |
| 2016/0032168 A1* | 2/2016 | Al-Bagoury ........... C09K 8/502 507/113 |
| 2016/0168443 A1* | 6/2016 | Lafitte ................ C04B 20/1029 507/112 |
| 2016/0333248 A1* | 11/2016 | Jiang ........................ C09K 8/20 |
| 2017/0226398 A1* | 8/2017 | Shimaoka ............... C09K 8/725 |
| 2017/0253786 A1* | 9/2017 | Hall ........................ C04B 28/04 |
| 2017/0298263 A1* | 10/2017 | Amanullah ............ C09K 8/514 |
| 2018/0037795 A1* | 2/2018 | Goel ........................ C09K 8/80 |
| 2018/0037797 A1* | 2/2018 | Brady ....................... G01V 3/32 |
| 2018/0148630 A1* | 5/2018 | Yakovlev ............... C09K 8/424 |
| 2019/0023694 A1* | 1/2019 | Sinha .................. C07D 403/14 |
| 2019/0145200 A1* | 5/2019 | Amanullah ............ C09K 8/487 175/72 |

OTHER PUBLICATIONS

Cosun Biobased Expert, BETAFIB ETD, retrieved Apr. 21, 2023 from https://www.ulprospector.com/en/na/PersonalCare/Detail/5168/5129923/Betafib-ETD (Year: 2023).*
Petronaft, Walnut Shell, retrieved Mar. 26, 2024 from https://www.petronaftco.com/walnut-shell/ (Year: 2024).*
Deville, Jay P.; Rady, Ayten; Zhou, Hui ( ). [Society of Petroleum Engineers SPE International Conference and Exhibition on Formation Damage Control—Lafayette, Louisiana, USA (Feb. 12, 2020)] SPE International Conference and Exhibition on Formation Damage Control—Nanocellulose as a New Degradable Suspension Additive for High-Density Calcium Brines.
International Search Report and Written Opinion for Application No. PCT/US2020/065830 dated Apr. 15, 2021.
United Kingdom Office Action for GB Patent Application No. 2210254.5 dated May 13, 2024. PDF file. 4 pages.

\* cited by examiner

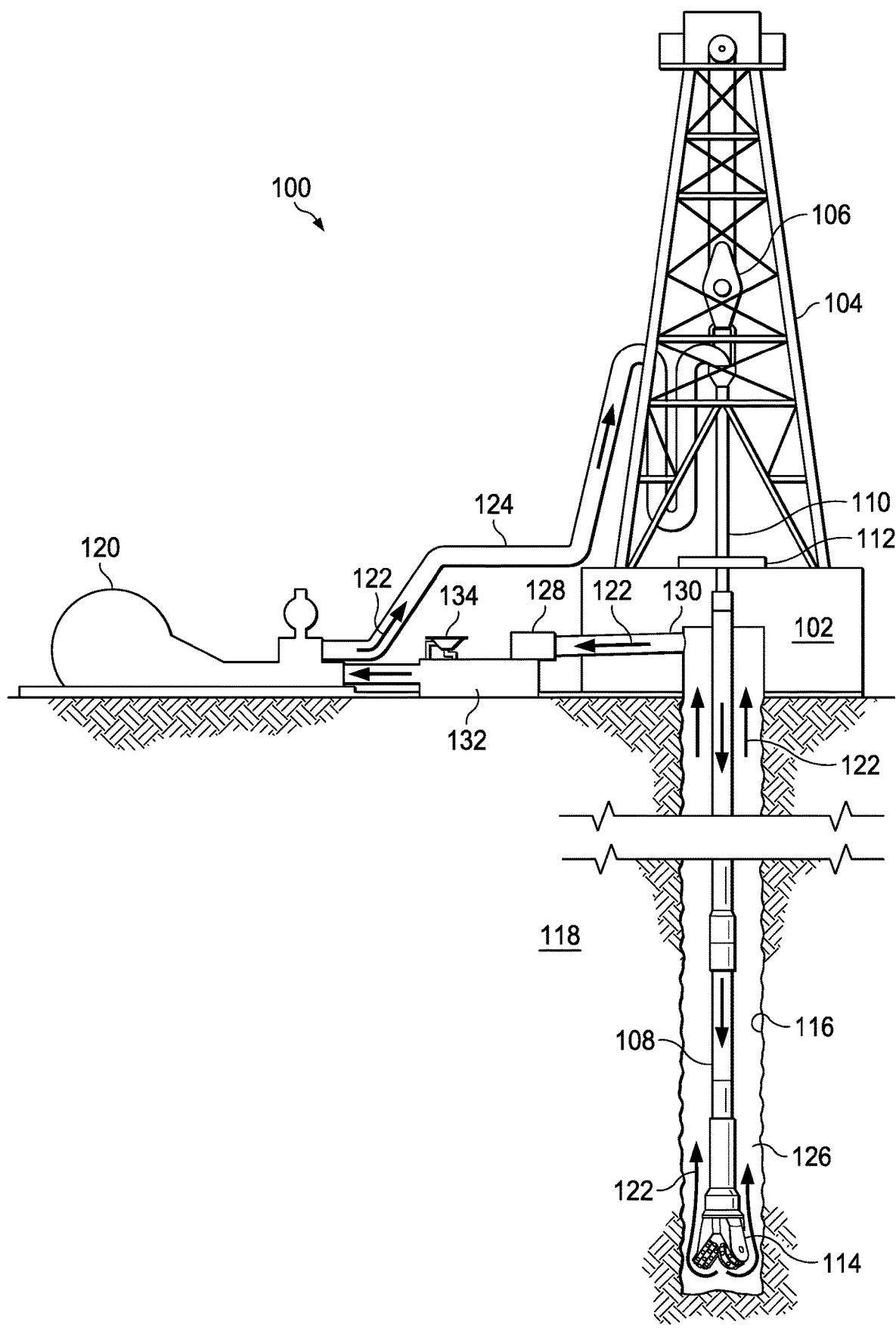

RHEOLOGY MODIFIERS FOR HIGH FLUID-LOSS SQUEEZE LOST CIRCULATION MATERIALS

CROSS-REFERENCE TO RELATED APPLICATION

This application claims priority to U.S. Provisional 62/978,449 filed Feb. 19, 2020 entitled "RHEOLOGY MODIFIERS FOR HIGH FLUID-LOSS SQUEEZE LOST CIRCULATION MATERIALS" which is herein incorporated by reference in its entirety.

BACKGROUND

The present disclosure relates to compositions for treating a subterranean formation and methods of preparing the same A natural resource such as oil or gas residing in a subterranean formation can be recovered by drilling a wellbore into the formation. A wellbore is typically drilled while circulating a drilling fluid through the wellbore. Among other things, the circulating drilling fluid may lubricate the drill bit, carry drill cuttings to the surface, and balance the formation pressure exerted on the wellbore. One problem associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." The loss of drilling fluid into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a wellbore.

One method that has been developed to control lost circulation involves the placement of lost circulation materials into the lost circulation zone. Conventional lost circulation materials may include fibrous, lamellated, or granular materials. The lost circulation materials may be placed into the formation, inter alia, as part of a drilling fluid or as a separate lost circulation pill in an attempt to control and/or prevent lost circulation. For a number of reasons, the use of lost circulation materials may not provide a desirable level of lost circulation control in all circumstances, especially in situations of severe to total lost circulation (e.g., >50 barrels per hour of losses). In order to handle these types of circumstances, another method that may be used is the high fluid-loss squeeze ("HFLS") technique, which is based upon a material's ability to defluidize rapidly to form an efficient plug across a loss zone. The advantage of the HFLS technique is obtained by mixing materials that yield a smaller particle size distribution, which contributes to a low-packing efficiency that yields a high fluid-loss nature. However, traditional viscosifiers and filtration control agents severely inhibit the high fluid-loss nature and thus reduce the effectiveness of the technique.

BRIEF DESCRIPTION OF THE DRAWINGS

These drawings illustrate certain aspects of some of the embodiments of the present disclosure and should not be used to limit or define the claims.

Figure is a schematic diagram of a system that may deliver treatment fluids of the present disclosure to a downhole location in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal operations, consolidation operations, and the like.

The present disclosure relates to methods and compositions for treating subterranean formations. More particularly, the present disclosure relates to methods and compositions for servicing a wellbore and, in certain embodiments, to the use of compositions in a wellbore to mitigate lost circulation.

In certain embodiments, the present disclosure provides compositions that may include an aqueous base fluid, a lost circulation material, and a rheology modifier that includes a nanocellulose material. In other embodiments, the present disclosure also provides methods that may include a treatment fluid including an aqueous base fluid, a lost circulation material, and a rheology modifier that includes a nanocellulose material. In some embodiments, the methods of the present disclosure may also include introducing the treatment fluid into a wellbore penetrating at least a portion of a subterranean formation including a loss zone. In some embodiments, the methods may further include allowing the treatment fluid to at least partially reduce filtration control in the loss zone. In some embodiments, the methods may further include allowing the treatment fluid to rapidly defluidize in the loss zone. In some embodiments, the methods may further include allowing the treatment fluid to at least partially reduce a rate of loss associated with the loss zone. In some embodiments, the methods may further include allowing the treatment fluid to at least partially plug the loss zone.

Among the many potential advantages of the present disclosure, the methods and compositions of the present disclosure may, among other things, provide improved rheology characteristics to fluids while not providing filtration control in the wellbore. Accordingly, the methods and compositions of the present disclosure may be used for high fluid-loss squeeze ("HFLS") applications to improve suspension while not providing filtration control. The lack of filtration control may be preferable since filtration control may impede defluidization and, in turn, may reduce the effectiveness of an HFLS application. For example, in some embodiments, the methods and compositions of the present disclosure may treat a loss zone by pumping a treatment fluid into a subterranean formation. In such embodiments, the treatment fluid may rapidly defluidize and leave behind a particulate plug that effectively seals the formation and prevents further losses to the formation. Moreover, the methods and compositions of the present disclosure may provide a treatment fluid that makes filtration control worse than it would be without the treatment fluid, particularly as compared with certain conventional treatment fluids. This may be an improvement over certain treatment fluids since some treatment fluids include rheology modifiers that provide both adequate suspension and some degree of filtration control, which is undesirable in HFLS applications.

In certain embodiments, the treatment fluids of the present disclosure may include a rheology modifier, an aqueous base fluid, and a lost circulation material. In certain embodiments, the treatment fluids of the present disclosure may be a lost circulation pill. The term "lost circulation pill," as used herein, refers to a carrier fluid that includes lost circulation material that enters loss circulation zones or porous portions of a formation where it will prevent or retard the entry of drilling or other wellbore fluids.

In certain embodiments, the rheology modifier used in the methods and compositions of the present disclosure may include a nanocellulose material. As used herein, the term "nanocellulose" refers to a biomass-derived nanomaterial that consists primarily of cellulose nanofibrils, crystalline nanocellulose, and bacterial nanocellulose. As compared to larger cellulosic fibers, the nanocellulose material may exhibit unique properties due to its distinctive morphologies and typical nanoparticle characteristics. Specifically, the nanocellulose material may be characterized by its substantial surface area, high strength and modulus, low coefficient of thermal expansion, and reactive surface of hydroxyl groups. In addition, the highly-ordered structures of nanocellulose material may provide increased thermal and chemical stability over conventional bulk cellulose. Furthermore, the high surface area and hydroxyl groups in nanocellulose materials may facilitate their dispersion in aqueous fluids, resulting in fluids with shear thinning rheology and thixotropy at relatively low concentrations.

In certain embodiments, the nanocellulose material may offer an ideal combination of suspension properties with little to no filtration control that would be an improvement over traditional rheology modifiers that are commonly used to treat lost circulation. For example, in some embodiments, the nanocellulose material may provide better suspension of particles than xanthan gum. In other embodiments, the nanocellulose material may provide higher temperature stability than xanthan gum. In still other embodiments, the nanocellulose material may provide better suspension of particles and higher temperature stability than xanthan gum. In some embodiments, the nanocellulose material may provide less filtration control than attapulgite. Without limiting the present disclosure to any particular theory or mechanism, in some embodiments, the nanocellulose material may disrupt the filter cake in a wellbore, which results in poor filtration control. This disruption of the filter cake may result from the entanglement of the dispersed and non-swelled fibrils in the nanocellulose material. Accordingly, the dispersed nanocellulose fibrils may make for a highly permeable filter cake that may cause the reduced filtration control.

In certain embodiments, the nanocellulose material used in the methods and compositions of the present disclosure may include the use of any nanocellulose known in the art. For instance, exemplary nanocellulose materials that may be suitable for certain embodiments of the present disclosure include, but are not limited to, a nanofibrillar cellulose, a nanocrystalline cellulose, a microfibrillar cellulose, cellulosic blends of microfibrillar and nanofibrillar cellulose, a bacterial nanocellulose, and any combination thereof. The selection of a suitable nanocellulose material may depend on several factors that would be recognized by a person of skill in the art with the benefit of this disclosure, including but not limited to, the other components in the treatment fluids of the present disclosure, the characteristics of the subterranean formation, the severity of the lost circulation, and the like.

In certain embodiments, the nanocellulose material may be derived from any suitable cellulose source, including but not limited to, cotton, wood, hemp, plant fibers, potato tuber cell, sugar beet, wheat straw, aquatic weeds, rice husk, lotus leaf stalk, soy hull, bamboo, ramie, pea hull fiber, pineapple leaf, bacteria, and any combination thereof. The nanocellulose material may be derived from these macroscopic fibers through a variety of processing techniques, including shear and/or chemical treatments. These techniques may remove weaker, amorphous cellulosic domains, resulting in the retention of the more robust portion in the remaining nanocellulose fibers. In one or more embodiments, functionalized nanocellulose may also be used. For example, the nanocellulose material may be chemically modified, such as oxidized nanocellulose, or nanocellulose that has been reacted to form anionic or cationic forms. In addition, in some embodiments, the nanocellulose material may be cross-linked by covalent or ionic crosslinkers.

In certain embodiments, the nanocellulose material may be any width suitable to achieve a desired function and/or a desired purpose. For example, in certain embodiments, the nanocellulose material may have a width in a range of from about 0.1 nanometers ("nm") to about 100 nm. In some embodiments, the nanocellulose material may have a width in a range of from about 1 nm to about 100 nm. In other embodiments, the nanocellulose material may have a width in a range of from about 10 nm to about 100 nm. Similarly, the nanocellulose material may be any length suitable to achieve a desired function and/or a desired purpose. For instance, in certain embodiments, the nanocellulose material may have a length in a range of from about 0.01 micrometers ("μm") to about 10 μm. In some embodiments, the nanocellulose material may have a length in a range of from about 0.1 μm to about 10 μm. In other embodiments, the nanocellulose material may have a length in a range of from about 0.2 μm to about 10 μm.

In certain embodiments, the rheology modifier used in the methods and compositions of the present disclosure may include the nanocellulose material in an amount sufficient to provide a desirable level of rheology modification. In certain embodiments, the nanocellulose material may be present in the treatment fluid in an amount from about 0.1 pounds per barrel ("ppb") to about 5 ppb by weight of the treatment fluid. In some embodiments, the nanocellulose material may be present in the treatment fluid in an amount from about 0.1 ppb to about 2 ppb by weight of the treatment fluid. In other embodiments, the nanocellulose material may be present in the treatment fluid in an amount from about 0.5 ppb to about 2 ppb by weight of the treatment fluid.

The treatment fluid of the present disclosure may include any aqueous base fluid known in the art. As used herein, the term "base fluid" refers to the major component of the fluid (as opposed to components dissolved and/or suspended therein), and does not indicate any particular condition or property of that fluid such as its mass, amount, pH, etc. Aqueous base fluids that may be suitable for use in the methods and compositions of the present disclosure may include water from any source. This may include fresh water, salt water (e.g., water containing one or more salts dissolved therein), brine (e.g., saturated salt water), seawater, and any combination thereof. The aqueous base fluid may be from a source that does not contain compounds that adversely affect other components of a fluid. In certain embodiments of the present disclosure, an aqueous base fluid may include one or more ionic species, such as those formed by salts dissolved in water. For example, seawater and/or produced water may include a variety of divalent cationic species dissolved therein. Most preferable embodiments will have the aqueous base fluid selected from the group consisting of water, a monovalent brine-based fluid, a low-density divalent brine-based fluid, and any combination thereof. The low-density divalent brine-based fluid may have a density of less than about 10 pounds per gallon.

In certain embodiments, the density of the aqueous base fluid may be adjusted, among other purposes, to provide additional particulate transport and suspension in the treatment fluid of the present disclosure. In certain embodiments, the pH of the aqueous base fluid may be adjusted (e.g., by a buffer or other pH adjusting agent) to a specific level, which may depend on, among other factors, the types of nanocellulose material, the lost circulation material, and any other additional additives included in the treatment fluid. One of ordinary skill in the art, with the benefit of this disclosure, will recognize when such density and/or pH adjustments are appropriate.

In certain embodiments, the treatment fluids of the present disclosure may be effective over a range of pH levels and mineralogies of subterranean formations. For example, in certain embodiments, the treatment fluid may provide effective loss zone treatment from a pH of about 7 to about 12. Additionally, the treatment fluids of the present disclosure may be suitable for a variety of subterranean formations, including, but not limited to shale formations and carbonate formations.

In certain embodiments, the treatment fluids of the present disclosure may be suitable for use at a variety of temperatures. In some embodiments, the materials that make up the treatment fluids may be stable at high temperatures. For example, the rheology modifier that includes the nanocellulose material may be thermally stable at higher temperatures as compared to traditional rheology modifiers, such as xanthan gum. In certain embodiments, the materials that make up the treatment fluids may be thermally stable at temperatures up to about 121° C. (250° F.). In some embodiments, the materials that make up the treatment fluids may be thermally stable at temperatures up to about 149° C. (300° F.). In other embodiments, the materials that make up the treatment fluids may be thermally stable at temperatures up to about 177° C. (350° F.). In still other embodiments, the materials that make up the treatment fluids may be thermally stable at temperatures above 177° C. (350° F.). Thus, in certain embodiments, the compositions and methods of the present disclosure may provide effective loss zone treatment, plug formation, and other wellbore treatment, even when used in temperature conditions that are outside the normal operating range of traditional rheology modifiers.

The treatment fluids of the present disclosure may include any type of lost circulation material known in the art. For example, in certain embodiments, the lost circulation material may include, but are not limited to, resilient graphitic carbon, nut shells (e.g., walnut, almond), polymers, polymer flakes, cellophane flakes, melamine flakes, ground coal, calcium carbonate, reticulated foam, and any combination thereof. In some embodiments, the lost circulation material may include a plurality of fibers. Examples of synthetic fibers suitable for certain embodiments of the present disclosure include, but are not limited to, polymers or copolymers composed of polypropylene, polyaramid, polyester, polyacrylonitrile, and polyvinyl alcohol. Examples of biodegradable fibers include, but are not limited to, fibers composed of modified cellulose, chitosan, soya, modified chitosan, polycaprolactone, polylactic acid, poly (3-hydroxybutyrate), polyhydroxy-alkanoates, polyglycolic acid ("PGA"), polylactic acid ("PLA"), polyorthoesters, polycarbonates, polyaspartic acid, polyphosphoesters, soya, or copolymers thereof. Examples of natural fibers suitable for certain embodiments of the present disclosure include, but are not limited to, fibers of cellulose including viscose cellulosic fibers, oil coated cellulosic fibers, and fibers derived from a plant product like paper fibers. Examples of other suitable fibers include, but are not limited to, carbon including carbon fibers; melt-processed inorganic fibers including basalt fibers, wollastonite fibers, non-amorphous metallic fibers, ceramic fibers, glass fibers, and other mineral fibers. The fibers also may be a composite fiber made from any combination of the preceding materials. In certain embodiments, the fibers may have a length to diameter aspect ratio in the range of about 2:1 to about 5,000:1. In certain embodiments, these lost circulation materials may be fibrous materials, such as shredded automobile tires or sawdust. In other embodiments, these lost circulation materials may be flaky materials, such as wood chips and mica flakes.

As will be appreciated by those of skill in the art, a lost circulation material longer than about 3 mm can sometimes pose pumpability restrictions, especially when included in high concentrations, making the use of the lost circulation material undesirable in some cases. For example, additional equipment may be required to cause a fluid containing long lost circulation material to by-pass certain types of downhole tools. Generally, a lost circulation material less than 3 mm long is acceptable for not causing pumpability restrictions for fluid, that is, for not unduly increasing the apparent viscosity or consistency of the fluid.

In some embodiments, the lost circulation material may have a specific gravity in the range of from about 0.7 to about 4.0. In some embodiments, the lost circulation material may have a hardness (Brinell value) in the range of from about 0.1 to about 500. In some embodiments, the lost circulation material may have a Brinell value in the range of from about 0.1 to about 10. In other embodiments, the lost circulation material may have a Brinell value in the range of from about 10.1 to about 200. In still other embodiments, the lost circulation materials may have a Brinell value in the range of from about 201 to about 500. In certain embodiments, the lost circulation material may have geometries ranging from spheres, ellipsoids, platelets, flakes, and fibers.

In certain embodiments, the treatment fluids of the present disclosure optionally may include any number of additional additives. Examples of such additional additives include, but are not limited to, salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluids of the present disclosure may include additional rheology (viscosity and gel strength) modifiers and stabilizers. A person skilled in the art, with the benefit of this disclosure, will recognize the types of additives that may be included in the treatment fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at a well site or at an offsite location. In certain embodiments, the fluids may be formed at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of at least one other component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure. In some embodiments, the treatment fluids of the present disclosure may be stored (e.g., in a tank or vessel) for a period of time before being introduced into a portion of a subterranean formation. In such embodiments, the treatment fluids may be stored for up to 12 months before being introduced into a portion of a subterranean formation.

In certain embodiments, the methods of the present disclosure may include introducing at least a portion of the treatment fluids into a loss zone or other flow path and causing or allowing the treatment fluids to at least partially set (e.g., form a solid, semi-solid, gel, plug, etc.). In some embodiments, the treatment fluids may be introduced into the wellbore to prevent the loss of aqueous or non-aqueous fluids into loss zones, such as voids, vugular zones, perforations, and natural or induced fractures. In certain embodiments, the treatment fluids may form a non-flowing, intact mass inside the loss zone, which plugs the zone and inhibits loss of subsequently pumped drilling fluid, which allows for further drilling. For example, in certain embodiments, the treatment fluids may function as a plug that is placed into an annulus of the wellbore and prepares the formation for placement of a second (e.g., cementitious) composition. In certain embodiments, the treatment fluids may be introduced into the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones, such as a void, a vugular zone, or a fracture; to be used as a fluid in front of cement slurry in cementing operations; to seal an annulus between the wellbore and an expandable pipe or pipe string; or any combination thereof. In some embodiments, one or more treatment fluids may at least partially plug a loss zone. In some embodiments, one or more treatment fluids may substantially plug all of the loss zone.

The methods and compositions of the present disclosure may be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In certain embodiments, a treatment fluid may be introduced into a subterranean formation. In some embodiments, the treatment fluid may be introduced into a wellbore that penetrates a subterranean formation. In certain embodiments, a wellbore may be drilled and the treatment fluid may be circulated in the wellbore during, before, or after the drilling. In some embodiments, the treatment fluid may be introduced into a subterranean formation via a single flow path (e.g., drill pipe, annulus, etc.). Introduction of the treatment fluids of the present disclosure may in certain embodiments include delivery using any of a tube, an umbilical, a pump, gravity, and any combinations thereof. The treatment fluids of the present disclosure may, in various embodiments, be delivered downhole (e.g., into the wellbore) or into top-side flowlines/pipelines or surface treating equipment. For example, in certain embodiments, the treatment fluids of the present disclosure may be applied to a subterranean formation and/or wellbore using batch treatments, squeeze treatments, continuous treatments, and/or any combinations thereof.

In some embodiments, the treatment fluids of the present disclosure may carry out a variety of subterranean treatments, including but not limited to, preflush treatments, afterflush treatments, hydraulic fracturing treatments, acidizing treatments, sand control treatments (e.g., gravel packing), "frac-pack" treatments, wellbore clean-out treatments, drilling operations, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like.

The treatment fluids disclosed herein may directly or indirectly affect one or more components or pieces of equipment associated with the preparation, delivery, recapture, recycling, reuse, and/or disposal of the treatment fluids of the present disclosure. For example, the methods and compositions of the present disclosure may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The treatment fluids of the present disclosure may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. In some embodiments, the treatment fluids of the present disclosure are introduced into a wellbore using one or more pumps.

For example, and with reference to Figure, the treatment fluids of the present disclosure may directly or indirectly affect one or more components or pieces of equipment associated with an exemplary wellbore drilling assembly 100, according to one or more embodiments. It should be noted that while Figure generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates wellbore fluid 122 (e.g., a drilling fluid or a lost circulation pill described herein) through a feed pipe 124 and to the kelly 110, which conveys the wellbore fluid 122 downhole through the interior of the drill string 108 and through one or more orifices in the drill bit 114 (or optionally through a bypass or ports (not shown) along the drill string and above the drill bit 114). The wellbore fluid 122 is then circulated back to the surface via an annulus 126 defined between the drill string 108 and the walls of the borehole 116. At the surface, the recirculated or spent wellbore fluid 122 exits the annulus 126 and may be conveyed to one or more fluid processing unit(s) 128 via an interconnecting flow line 130. After passing through the fluid processing unit(s) 128, a "cleaned" wellbore fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids may be added to the wellbore fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the treatment fluids of the present disclosure may be added to the wellbore fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the treatment fluids of the present disclosure may be stored, reconditioned, and/or regulated until added to the wellbore fluid 122.

As mentioned above, the treatment fluids of the present disclosure may directly or indirectly affect the components and equipment of the drilling assembly 100. For example, the treatment fluids of the present disclosure may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary treatment fluids.

The treatment fluids of the present disclosure may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The treatment fluids of the present disclosure may also directly or indirectly affect the mixing hopper 134 and the retention pit 132 and their assorted variations.

The treatment fluids of the present disclosure may also directly or indirectly affect the various downhole equipment and tools that may come into contact with the treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The treatment fluids of the present disclosure may also directly or indirectly affect any downhole heat exchangers, valves and corresponding actuation devices, tool seals, packers and other wellbore isolation devices or components, and the like associated with the wellbore 116. The treatment fluids of the present disclosure may also directly or indirectly affect the drill bit 114, which may include, but is not limited to, roller cone bits, PDC bits, natural diamond bits, any hole openers, reamers, coring bits, etc.

An embodiment of the present disclosure is a method that includes: providing a treatment fluid that includes an aqueous base fluid, a lost circulation material, and a rheology modifier that includes a nanocellulose material; introducing the treatment fluid into a wellbore penetrating at least a portion of a subterranean formation including a loss zone; and allowing the treatment fluid to rapidly defluidize in the loss zone.

In one or more embodiments described in the preceding paragraph, the method includes allowing the treatment fluid to at least partially plug the loss zone. In one or more embodiments described in the preceding paragraph, the method includes allowing the treatment fluid to plug substantially all of the loss zone. In one or more embodiments described in the preceding paragraph, the method includes allowing the treatment fluid to at least partially reduce filtration control in the loss zone. In one or more embodiments described in the preceding paragraph, the method includes allowing the treatment fluid to at least partially reduce a rate of loss associated with the loss zone. In one or more embodiments described in the preceding paragraph, the nanocellulose material is selected from the group consisting of a nanocrystalline cellulose, a nanofibrillar cellulose, a microfibrillar cellulose, a cellulosic blend of nanofibrillar and microfibrillar cellulose, a bacterial nanocellulose, and any combination thereof. In one or more embodiments described in the preceding paragraph, the nanocellulose material has a cellulose source that is selected from the group consisting of a cotton, a wood, a hemp, a plant fiber, a potato tuber cell, a sugar beet, a wheat straw, an aquatic weed, a rice husk, a lotus leaf stalk, a soy hull, a bamboo, a ramie, a pea hull fiber, a pineapple leaf, a bacteria, and any combination thereof. In one or more embodiments described in the preceding paragraph, the nanocellulose material has a width in a range of from about 0.1 to about 100 nanometers and a length in a range of from about 0.01 to about 10 micrometers. In one or more embodiments described in the preceding paragraph, the nanocellulose material is present in the treatment fluid in an amount of from about 0.1 to about 5 pounds per barrel by weight of the treatment fluid. In one or more embodiments described in the preceding paragraph, the aqueous base fluid includes at least one component selected from the group consisting of: water, a monovalent brine-based fluid, a low-density divalent brine-based fluid, and any combination thereof. In one or more embodiments described in the preceding paragraph, the low-density divalent brine-based fluid has a density of less than about 10 pounds per gallon. In one or more embodiments described in the preceding paragraph, the treatment fluid is introduced into the wellbore penetrating at least a portion of the subterranean formation including the loss zone in conjunction with a high fluid-loss squeeze operation. In one or more embodiments described in the preceding paragraph, the treatment fluid is thermally stable up to at least about 250° F.

An embodiment of the present disclosure is a composition that includes an aqueous base fluid, a lost circulation material, and a rheology modifier that includes a nanocellulose material.

In one or more embodiments described in the preceding paragraph, the nanocellulose material is selected from the group consisting of a nanocrystalline cellulose, a nanofibrillar cellulose, a microfibrillar cellulose, a cellulosic blend of nanofibrillar and microfibrillar cellulose, a bacterial nanocellulose, and any combination thereof. In one or more embodiments described in the preceding paragraph, the nanocellulose material has a cellulose source that is selected from the group consisting of a cotton, a wood, a hemp, a plant fiber, a potato tuber cell, a sugar beet, a wheat straw, an aquatic weed, a rice husk, a lotus leaf stalk, a soy hull, a bamboo, a ramie, a pea hull fiber, a pineapple leaf, a bacteria, and any combination thereof. In one or more embodiments described in the preceding paragraph, the nanocellulose material has a width in a range of from about 0.1 to about 100 nanometers and a length in a range of from about 0.01 to about 10 micrometers. In one or more embodiments described in the preceding paragraph, the aqueous base fluid includes at least one component selected from the group consisting of: water, a monovalent brine-based fluid, a low-density divalent brine-based fluid, and any combination thereof.

An embodiment of the present disclosure is a method that includes: providing a lost circulation pill that includes an aqueous base fluid that includes at least one component selected from the group consisting of: water, a monovalent brine-based fluid, a low-density divalent brine-based fluid, and any combination thereof; a lost circulation material; and a rheology modifier that includes a nanocellulose material, wherein the nanocellulose material is selected from the group consisting of a nanocrystalline cellulose, a nanofibrillar cellulose, a microfibrillar cellulose, a cellulosic blend of nanofibrillar and microfibrillar cellulose, a bacterial nanocellulose, and any combination thereof; introducing the lost circulation pill into a wellbore penetrating at least a portion of a subterranean formation including a loss zone; and allowing the lost circulation pill to rapidly defluidize in the loss zone.

In one or more embodiments described in the preceding paragraph, the lost circulation pill is introduced into the wellbore penetrating at least a portion of the subterranean formation including the loss zone in conjunction with a high fluid-loss squeeze operation.

To facilitate a better understanding of the present disclosure, the following examples of certain aspects of some embodiments are given. The following examples are not the only examples that could be given according to the present disclosure and are not intended to limit the scope of the disclosure or claims.

EXAMPLE

In certain embodiments, the methods and compositions of the present disclosure may include a nanocellulose formulation that may unexpectedly exhibit properties useful in wellbore applications as shown in the example below. For instance, in some embodiments, the nanocellulose formation may result in fluids that improve suspension while not providing filtration control.

In this example, a standard reservoir drill-in fluid (RDF) formulation was prepared as listed in Table 1 below. Next, rheological, gel strength, and API filtration measurements were performed on the standard RDF formulation with monovalent brine (NaCl) using either xanthan gum or nanocellulose as a viscosifying agent (rheology modifier). The rheological and gel strength measurements were performed using a Fann™ 45 viscometer at 120° F. following API 13B-1 procedures. The API filtration test was performed at room temperature and 100-psi using a static filter press for thirty minutes, in which the measured fluid loss was the volume of filtrate collected in this time period. Cross-linked starch was used as a fluid loss control agent. The results of these tests are reported in Table 2 below.

TABLE 1

Standard Reservoir Drill-In Fluid (RDF) Formulations.

| Additive | Concentration |
| --- | --- |
| Brine | 0.95 bbl/bbl |
| Viscosifier | Variable |
| Alkalinity Agent | 1 lb/bbl |
| Fluid Loss Control Agent | 6 lb/bbl |
| Sized Calcium Carbonate | 40 lb/bbl |

TABLE 2

Full RDF Formulation Data In NaCl Brine.

| Brine | 9.0 lb/gal NaCl | | | |
| --- | --- | --- | --- | --- |
| Viscosifier | Xanthan Gum | | Nanocellulose | |
| Concentration (lb/bbl) | 1 | | 1 | |
| 120° F. Rheology | BHR | AHR | BHR | AHR |
| 600 rpm | 48 | 46 | 33 | 49 |
| 300 rpm | 35 | 34 | 26 | 37 |
| 200 rpm | 30 | 29 | 22 | 32 |
| 100 rpm | 23 | 22 | 17 | 24 |
| 6 rpm | 8 | 7 | 9 | 11 |
| 3 rpm | 6 | 4 | 6 | 9 |
| Plastic Viscosity, cP | 13 | 12 | 7 | 12 |
| Yield Point, lb/100 ft2 | 22 | 22 | 19 | 25 |
| 10 sec gel, lb/100 ft2 | 6 | 5 | 10 | 15 |
| 10 min gel, lb/100 ft$^2$ | 7 | 6 | 14 | 20 |
| API filtrate, mL | — | 2.5 | — | No Control |

As shown in Table 2, the standard RDF formulation with monovalent brine using either xanthan gum or nanocellulose as a viscosifying agent exhibited relatively comparable rheological profiles on shearing at different rotational speeds, as well as relatively flat gel strength measurements. However, the standard RDF formulation with xanthan gum provided 2.5 milliliters ("mL") of fluid loss while the standard RDF formulation with nanocellulose provided no fluid loss control (>40 mL).

The above experiments were repeated with only one modification where the monovalent brine was substituted for either fresh water or high-density divalent brine. For the fresh water tests, the rheological, gel strength, and fluid loss measurements were similar to Table 2. For the high-density divalent brine tests, the results are shown below in Table 3. It is important to note that the fluid loss control of the formulation with nanocellulose (1.8 mL) was comparable to that of the formulation with xanthan gum (1.0 mL). Accordingly, the use of nanocellulose material as a rheology modifier may be limited to HFLS application with fresh water, monovalent brines, or low-density divalent brines (e.g., brines having density of less than about 10 pounds per gallon (lb/gal)).

TABLE 3

Full RDF Formulation Data In CaBr2 Brine.

| Brine | 13.1 lb/gal CaBr2 | | | |
| --- | --- | --- | --- | --- |
| Viscosifier | Xanthan Gum | | Nanocellulose | |
| Concentration (lb/bbl) | 1 | | 1 | |
| 120° F. Rheology | BHR | AHR | BHR | AHR |
| 600 rpm | 123 | 123 | 97 | 108 |
| 300 rpm | 77 | 77 | 70 | 78 |
| 200 rpm | 59 | 57 | 60 | 66 |
| 100 rpm | 36 | 35 | 46 | 51 |
| 6 rpm | 4 | 3 | 24 | 25 |
| 3 rpm | 3 | 2 | 21 | 22 |
| Plastic Viscosity, cP | 46 | 46 | 27 | 30 |
| Yield Point, lb/100 ft2 | 31 | 31 | 43 | 48 |
| 10 sec gel, lb/100 ft2 | 1 | 2 | 25 | 25 |
| 10 min gel, lb/100 ft2 | 4 | 3 | 37 | 34 |
| API filtrate, mL | — | 1.0 | — | 1.8 |

Thus, this example demonstrates that the compositions of the present disclosure including an aqueous base fluid, a lost circulation material, and a rheology modifier that includes a nanocellulose material may improve suspension while not providing filtration control in a wellbore in order to reduce the loss of fluid into the formation. This result suggests that the compositions and methods of the present disclosure may increase the efficiency of HFLS applications since it allows a treatment fluid to rapidly defluidize and leave behind a particulate plug that effectively seals the formation and prevents further losses to the formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
   providing a treatment fluid with a 40 ml fluid loss or greater according to API filtration test that comprises:
      an aqueous base fluid, wherein the aqueous base fluid comprises at least one component selected from the group consisting of a monovalent brine-based fluid, a low-density divalent brine-based fluid having a density of less than about 10 pounds per gallon, and any combination thereof;

a lost circulation material, wherein the lost circulation material has a specific gravity in the range of from about 0.7 to about 4.0 and a Brinell value in the range of from about 0.1 to about 10;

6 lb/bbl of fluid loss control agent; and a rheology modifier that comprises a nanocellulose material, wherein the nanocellulose material is present in the treatment fluid in an amount of from about 0.1 to about 5 pounds per barrel by weight of the treatment fluid;

crosslinking the nanocellulose material by a crosslinker;

introducing the treatment fluid into a wellbore penetrating at least a portion of a subterranean formation including a loss zone; and allowing the treatment fluid to defluidize in the loss zone.

2. The method of claim 1, further comprising allowing the treatment fluid to at least plug one loss zone.

3. The method of claim 1, further comprising allowing the treatment fluid to plug all of the loss zone.

4. The method of claim 1, wherein the nanocellulose material is selected from the group consisting of a nanocrystalline cellulose, a nanofibrillar cellulose, a bacterial nanocellulose, and any combination thereof.

5. The method of claim 1, wherein the nanocellulose material has a cellulose source that is selected from the group consisting of a cotton, a wood, a hemp, a plant fiber, a potato tuber cell, a sugar beet, a wheat straw, an aquatic weed, a rice husk, a lotus leaf stalk, a soy hull, a bamboo, a ramie, a pea hull fiber, a pineapple leaf, a bacteria, and any combination thereof.

6. The method of claim 1, wherein the nanocellulose material has a width in a range of from about 0.1 to about 100 nanometers and a length in a range of from about 0.01 to about 10 micrometers.

7. The method of claim 1, wherein the treatment fluid is introduced into the wellbore penetrating at least a portion of the subterranean formation including the loss zone in conjunction with a high fluid-loss squeeze operation, wherein 50 barrels per hour of treatment fluid are lost.

8. The method of claim 1, wherein the treatment fluid is thermally stable up to and including 350° F.

9. The method of claim 1, wherein the lost circulation material comprises at least one biodegradable fiber selected from a group consisting of chitosan, soya, polycaprolactone, polylactic acid, poly (3-hydroxybutyrate), polyhydroxy-alkanoates, polyglycolic acid ("PGA"), polylactic acid ("PLA"), polyaspartic acid, polyphosphoesters, and copolymers thereof.

10. A method comprising:

providing a lost circulation pill with a 40 ml fluid loss or greater according to API filtration test that comprises:

an aqueous base fluid that comprises at least one component selected from the group consisting of a monovalent brine-based fluid, a low-density divalent brine-based fluid having a density of less than about 10 pounds per gallon, and any combination thereof;

a lost circulation material, wherein the lost circulation material has a specific gravity in the range of from about 0.7 to about 4.0 and a Brinell value in the range of from about 0.1 to about 10;

6 lb/bbl of fluid loss control agent; and a rheology modifier that comprises a nanocellulose material, wherein the nanocellulose material is present in the treatment fluid in an amount of from about 0.1 to about 5 pounds per barrel by weight of the treatment fluid and wherein the nanocellulose material is selected from the group consisting of a nanocrystalline cellulose, a nanofibrillar cellulose, a microfibrillar cellulose, a cellulosic blend of nanofibrillar and microfibrillar cellulose, a bacterial nanocellulose, and any combination thereof;

crosslinking the nanocellulose material by a crosslinker;

introducing the lost circulation pill into a wellbore penetrating at least a portion of a subterranean formation including a loss zone; and allowing the lost circulation pill to defluidize in the loss zone.

11. A method of claim 10, wherein the lost circulation pill is introduced into the wellbore penetrating at least a portion of the subterranean formation including the loss zone in conjunction with a high fluid-loss squeeze operation, wherein 50 barrels per hour of treatment fluid are lost.

12. The method of claim 10, wherein the lost circulation material comprises at least one biodegradable fiber selected from a group consisting of chitosan, soya, polycaprolactone, polylactic acid, poly (3-hydroxybutyrate), polyhydroxy-alkanoates, polyglycolic acid ("PGA"), polylactic acid ("PLA"), polyaspartic acid, polyphosphoesters, and copolymers thereof.

* * * * *